United States Patent [19]
Edwards et al.

[11] Patent Number: 5,633,564
[45] Date of Patent: May 27, 1997

[54] MODULAR UNINTERRUPTIBLE LIGHTING SYSTEM

[76] Inventors: M. Larry Edwards, 3311 22nd St., Apt. 15, Woodward, Okla. 73801; Allan A. Nostwick, 4625 N. 615th West, Huntington, Ind. 46750; Roland O. Hildebrand, 1908 Windlea, Euless, Tex. 76040

[21] Appl. No.: 457,015

[22] Filed: Jun. 1, 1995

[51] Int. Cl.$^6$ .................................................. H05B 37/00
[52] U.S. Cl. ............................. 315/86; 315/317; 307/46; 307/66; 362/20
[58] Field of Search .................... 315/86, 119, 160, 315/161, 175, 176, DIG. 5, 317, 307, 224; 307/64, 66; 362/20, 85, 276

[56] References Cited

U.S. PATENT DOCUMENTS

| | | | |
|---|---|---|---|
| 3,842,249 | 10/1974 | Geyer et al. | 235/151.21 |
| 4,216,384 | 8/1980 | Hurley | 307/39 |
| 4,242,614 | 12/1980 | Vatis et al. | 315/153 |
| 4,345,162 | 8/1982 | Hammer et al. | 307/39 |
| 4,388,567 | 6/1983 | Yamazaki et al. | 315/291 |
| 4,575,679 | 3/1986 | Chung et al. | 324/427 |
| 4,716,344 | 12/1987 | Newell et al. | 315/312 |
| 4,727,291 | 2/1988 | Bavaro | 315/86 |
| 4,837,665 | 6/1989 | Hoyer et al. | 362/96 |
| 4,945,280 | 7/1990 | Beghelli | 315/129 |
| 5,037,089 | 8/1991 | Spagnuolo et al. | 272/134 |
| 5,101,141 | 3/1992 | Warner et al. | 315/297 |
| 5,154,504 | 10/1992 | Helal et al. | 362/20 |
| 5,237,207 | 8/1993 | Kwiatkowski et al. | 307/31 |
| 5,252,891 | 10/1993 | Huang | 315/86 |
| 5,329,431 | 7/1994 | Taylor et al. | 362/85 |
| 5,357,170 | 10/1994 | Luchaco et al. | 315/159 |
| 5,365,145 | 11/1994 | Fields | 315/86 |

Primary Examiner—Robert Pascal
Assistant Examiner—David H. Vu
Attorney, Agent, or Firm—Harold Levine Esq. PC

[57] ABSTRACT

A modular fail-safe uninterruptible lighting system in which lights are identified singly and/or in clusters to form separately controllable entities. Each entity is provided with a modular receiver that is individually controllable to any of six selected states; and one or more modular switched logic controllers is provided to produce signals individually representing the six states. These signals are conducted from the switched logic controllers to the receivers at relatively low control voltages so as to cause the entities to function according to selected states when an outage occurs on the normal lighting system power source.

34 Claims, 14 Drawing Sheets

MODULAR UNINTERRUPTIBLE LIGHTING SYSTEM

Reference is herein made to the following co-pending U.S. patent applications:

| APPLN SER. NO. | FILED | TITLE |
|---|---|---|
| 08/456,854 | 06-01-95 | Fail-Safe Lighting System with Load Shedding and Dimming |
| 08/457,394 | 06-01-95 | Phase COntrolled Bridge |

This invention relates to lighting systems and more particularly to systems that provide for a broad and versatile selection of modes of operation of lights when a principal source of power is interrupted.

BACKGROUND OF THE INVENTION

Emergency and uniterruptible lighting systems have heretofore been proposed, illustrative of which are those shown and described in co-pending U.S. patent application Ser. No. 08/063,359 filed by M. Larry Edwards and W. Joe Watson on May 17, 1993 now U.S. Pat. No. 5,471,114 granted Nov. 28, 1995. In accordance with such prior proposals, one or more lights or banks of lights are controlled selectively such that when in a fail-safe emergency mode, the light(s) continue to be energized for a substantial period of time after normal sources of electric power are interrupted. According to the foregoing proposal, a battery is continuously connected to one or more light ballasts such that as alternating current from a commercial source is supplied and rectified, the battery alternately receives and supplies current during each cycle thus retaining its charge so long as power is being received from the mains. When power from the mains is interrupted, the battery continues to supply power to the lights thus maintaining their luminescence without the necessity for switching.

Other proposals have been made for switching between power from commercial sources and the like to battery power for lighting systems during power outages. Still other proposals have been made for selective energization of one of a pair of lights when the normal source of power is interrupted. Such proposal is set forth in U.S. Pat. No. 4,727,291 granted to Joseph P. Bavaro on Feb. 23, 1988. Yet other proposals have been made for emergency lighting systems with routine self diagnosis. Such are illustrated in U.S. Pat. No. 4,945,280 granted to Gian P. Beghelli on Jul. 31, 1990. Although these proposals include a variety of systems and types of operation, there has continued to be a need for a modular fail-safe lighting system in which provision is made for selection of any of a wide variety of modes of operation when the normal source of power is interrupted and in which such selection can be made simply and easily in the field.

BRIEF SUMMARY OF THE INVENTION

The improved system according to the invention hereof includes combinations of system components or modules that may optionally connected to provide great versatility to and simplify customization to a user's needs. Included are improved non-interruptible power supply battery charging and light energization. A power converter has, at its input end, a passive harmonic filter and diode rectifier circuit, with provisions for switching the rectifier circuit for either bridge or voltage doubler operation, said switching being linked to additional switching provisions to configure the harmonic filter for higher or lower voltage operation. This is followed by a phase modulated 50% duty cycle bridge operating in a current mode. Working together, they improve efficiency and control line transients and harmonics.

A battery connected to a dc bus provides energy for maintaining uniterrupted flickerless light operation when a power outage occurs; and any one of several switched logic controllers may be selected for controllably interconnecting a light, a plurality of lights or groups of lights to the dc bus to cause the lights to operate collectively or severally in any selected one or ones of six modes of operation that are made available through a control switched logic module. The control switched logic module is provided with a plurality of modular output terminals each representing a different one of plurality of differing modes of operation of the lights. Selection of a mode of operation for lights connected to a switched logic receiver is made by connecting the control input lead of the switched logic receiver directly or through one of the timing modules (if a timing features is desired) to the selected output connector of the control switched logic module. Thus, any of a variety of control modes may be individually selected for single lights or groups of lights. Also available for combining with other system elements are optional dimming and load shedding modules that greatly add to the versatility of the system and permit it to be customized to meet an even greater range of customer needs.

OBJECTS AND FEATURES OF THE INVENTION

It is one general object of the invention to improve emergency and uniterruptible lighting systems.

It is another object of the invention to improve versatility in uninterruptible lighting systems.

It is still another object of the invention to simplify selection of a desired mode of operation for selected lights.

It is yet another object of the invention to provide in one comprehensive lighting system, an extended range of input voltage compatibility.

It is still another object of the invention to provide within a highly versatile uninterruptible lighting system a wide range of operation modes.

It is one further object of the invention to provide for ease of mode selectability by field personnel when installation or change of a system is desired.

Accordingly, in accordance with one feature of the invention, a switched logic module is provided with a plurality of modular output connections each representing a different one of a plurality of selectable control modes of lighting operation thereby facilitating selection and simplifying field connection to reflect user choices.

In accordance with another feature of the invention, through utilization of the aforementioned modular output connections, provision is made for ease of connection of any of a variety of optional additional modules (e.g., load shedding/dimming as set forth in co-pending U.S. patent application Ser. No. 08/456,854 filed Jun. 1, 1995, thus facilitating ease of selecting for implementation the full range of system capabilities.

In accordance with another feature of the invention, the principal parts of the system are constructed in modular form, thus imparting improved flexibility for customizing the system in the field by field personnel.

In accordance with yet another feature of the invention, an improved switched logic receiver is employed to receive and distinguish control signals representing any selected one of said modes and for conditioning a conventional ballast to operate accordingly, thus facilitating installation and use with existing lighting.

In accordance with still another feature of the invention, a unique combination of switched logic receiver and ballast are provided to facilitate use in existing systems that either do not contain conventional ballasts or in newly installed systems, thus improving flexibility and cost effectiveness.

In accordance with yet one further feature of the invention, provision is made for direct connection, with an appropriate selection of the position of a set of internal jumpers carried by a suitable connecting device, to a wide range of supply voltages, thus facilitating use and reducing the number of different operating modules needed to meet differing voltage supply requirements.

These and other objects and features of the invention will be apparent from the following description, by way of example of a preferred embodiment, with reference to the drawing.

DESCRIPTION OF A PREFERRED EMBODIMENT

Figure 1:
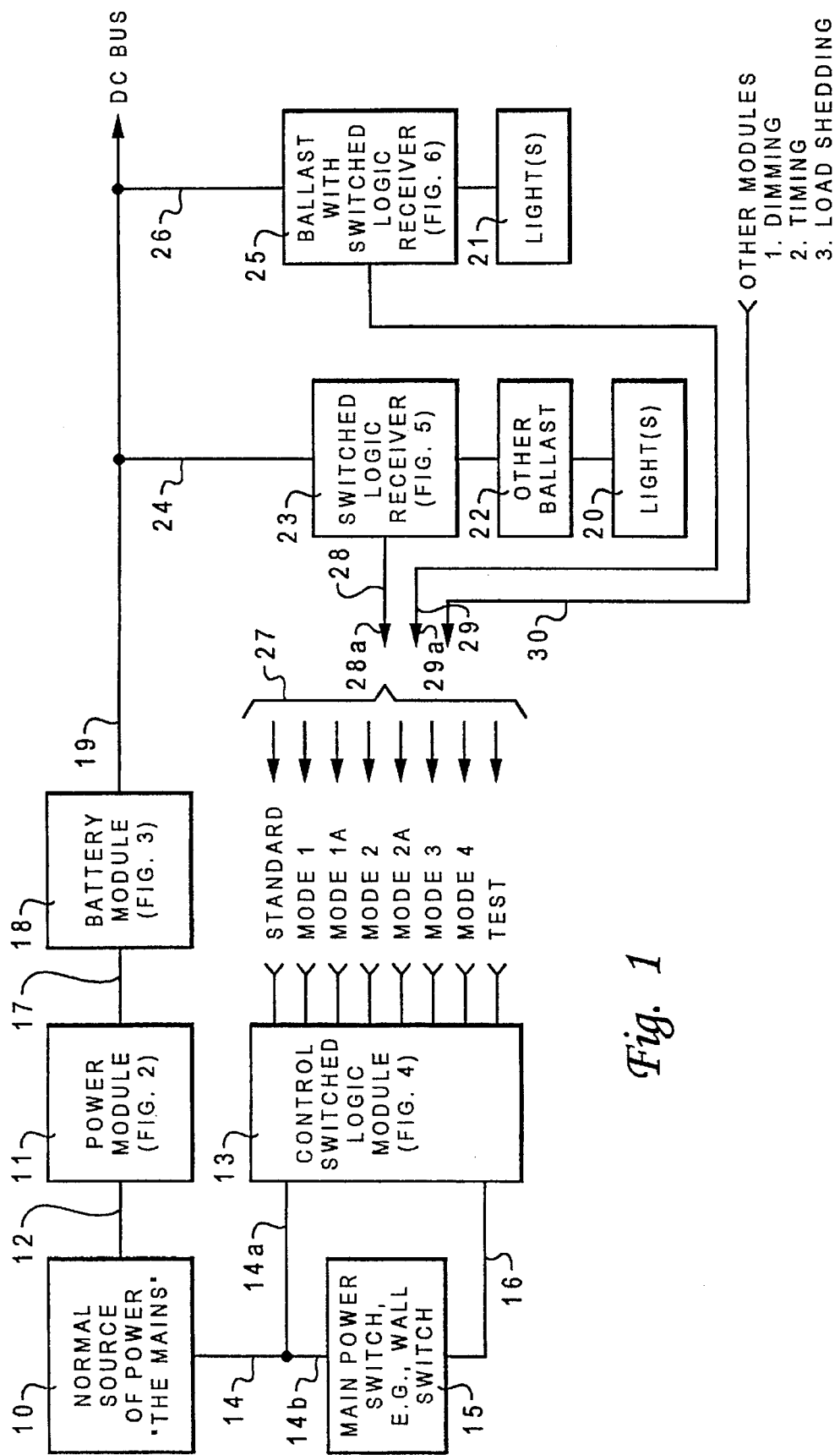
FIG. 1 is a simplified block diagram illustrating the modular architecture of the system.
Figure 2A:
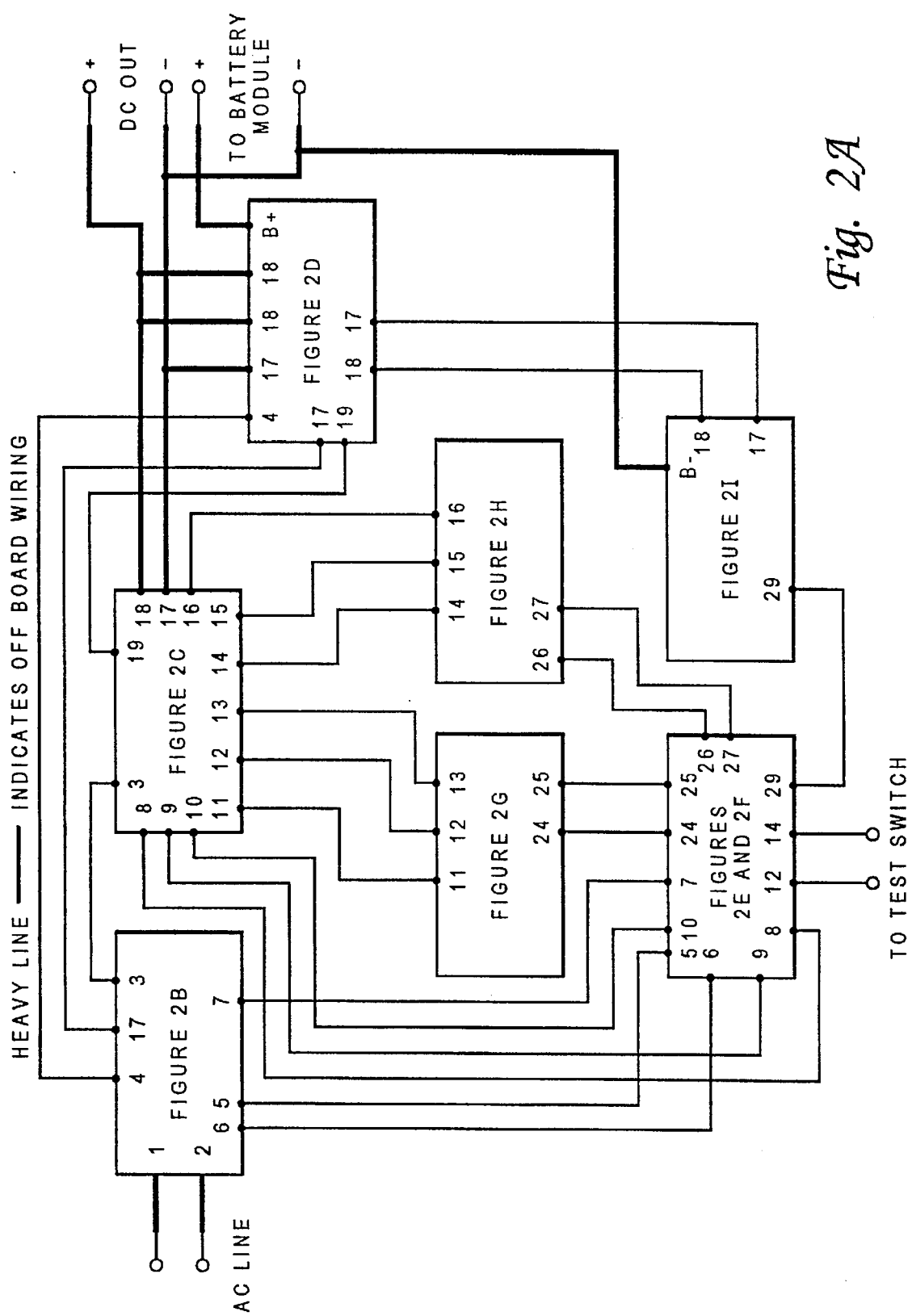
FIG. 2A is a block diagram depicting connections between circuits set forth in FIGS. 2B, 2C, 2D, 2E, 2F, 2G, 2H and 2I.
Figure 2B:
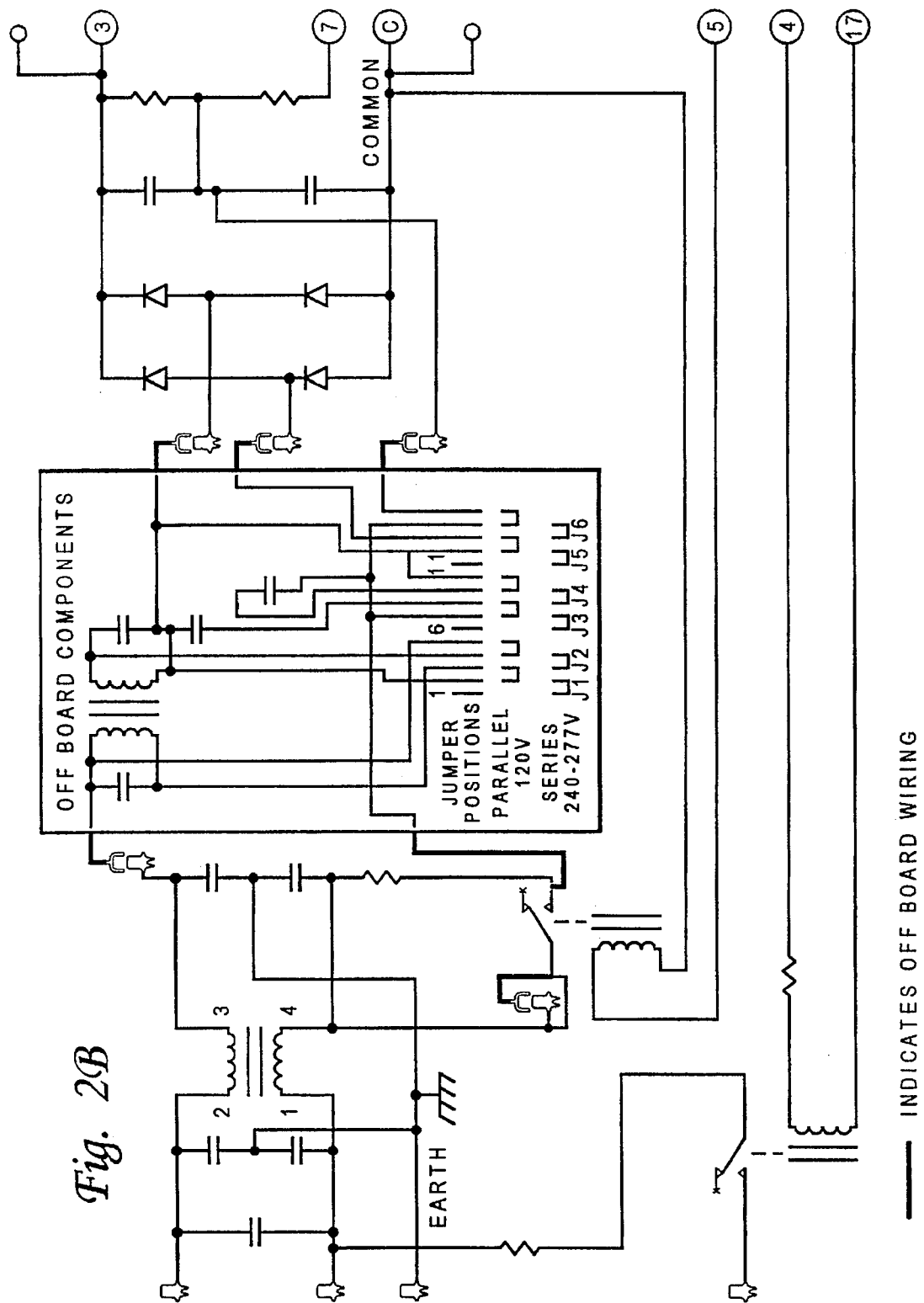
FIG. 2B is a schematic diagram illustrating input circuits and the simplicity of changing of jumpers to correspondingly condition the circuits for different ranges of input voltages.
Figure 2C:
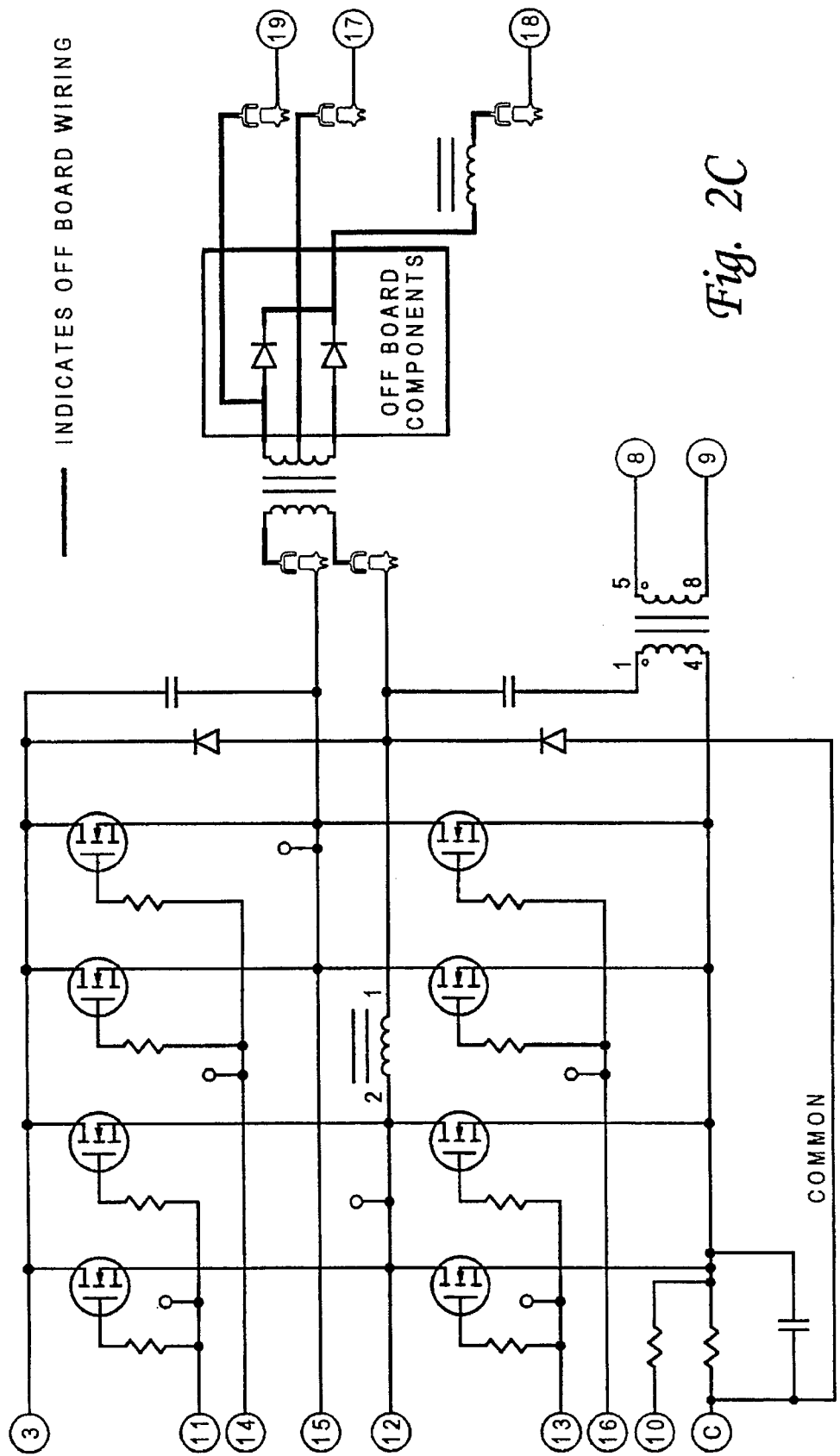
FIG. 2C is a schematic diagram of the preferred bridge converter according to the invention.
Figure 2D:
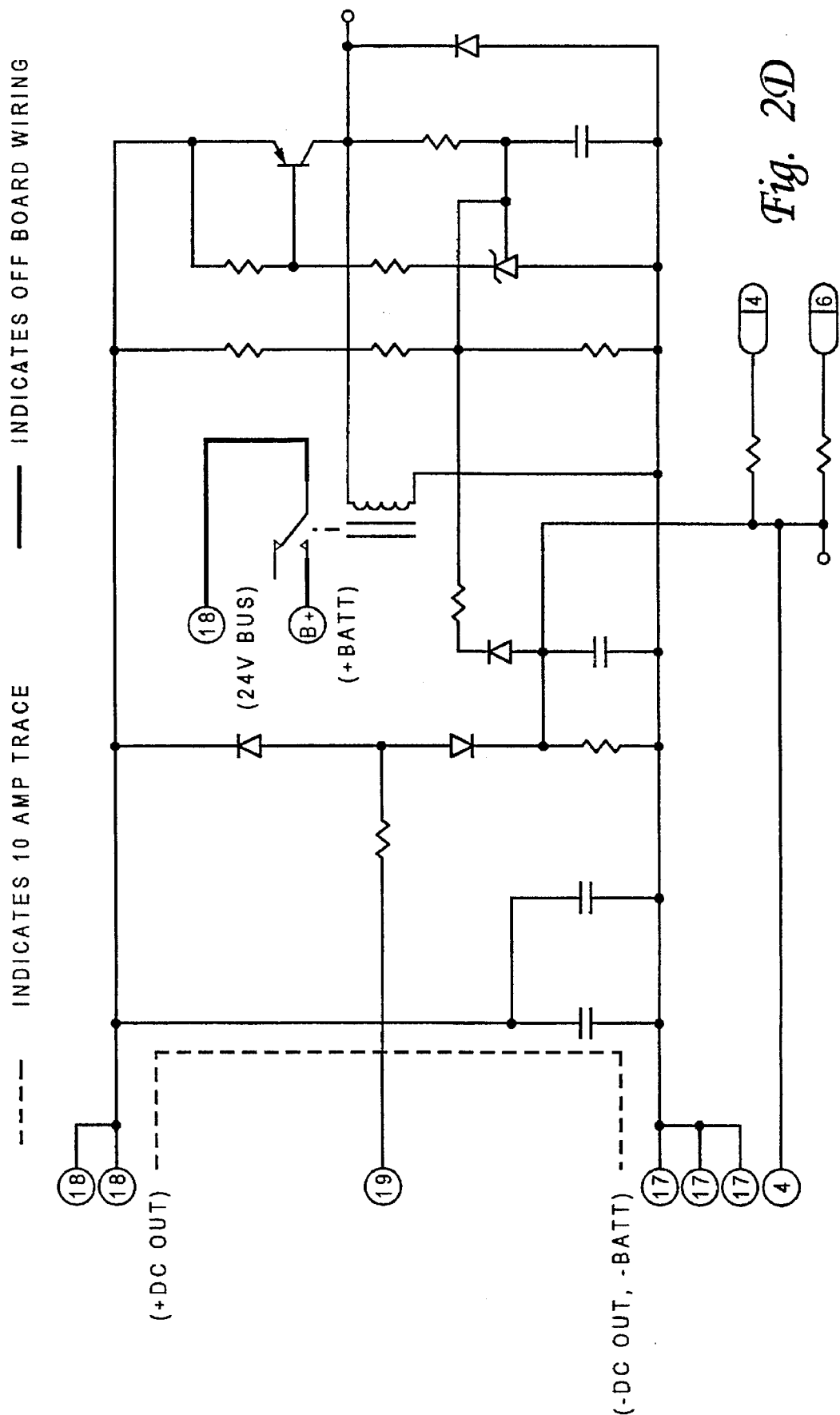
FIG. 2D is a schematic diagram of battery low voltage cut-off circuits.
Figure 2E:
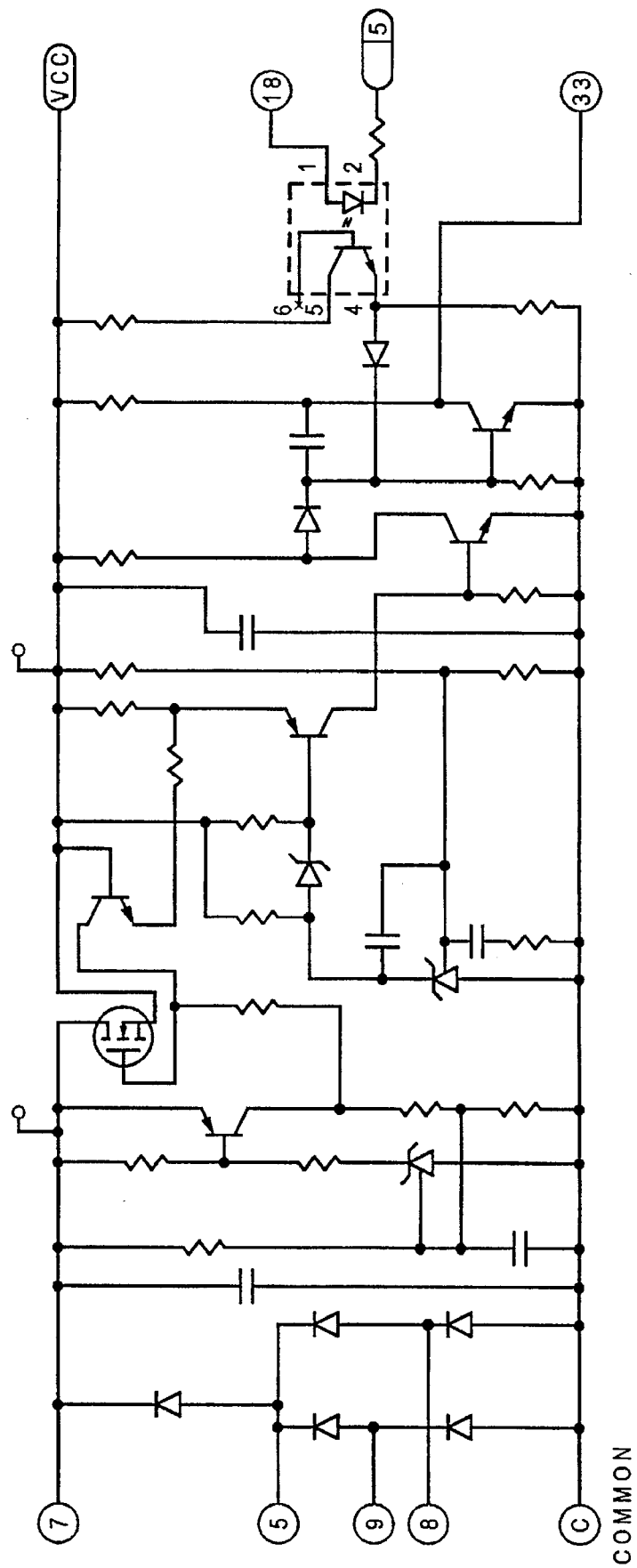
FIG. 2E is a schematic diagram of start up, internal voltage supply regulating, and soft start and shut-down control circuits.
Figure 2F:
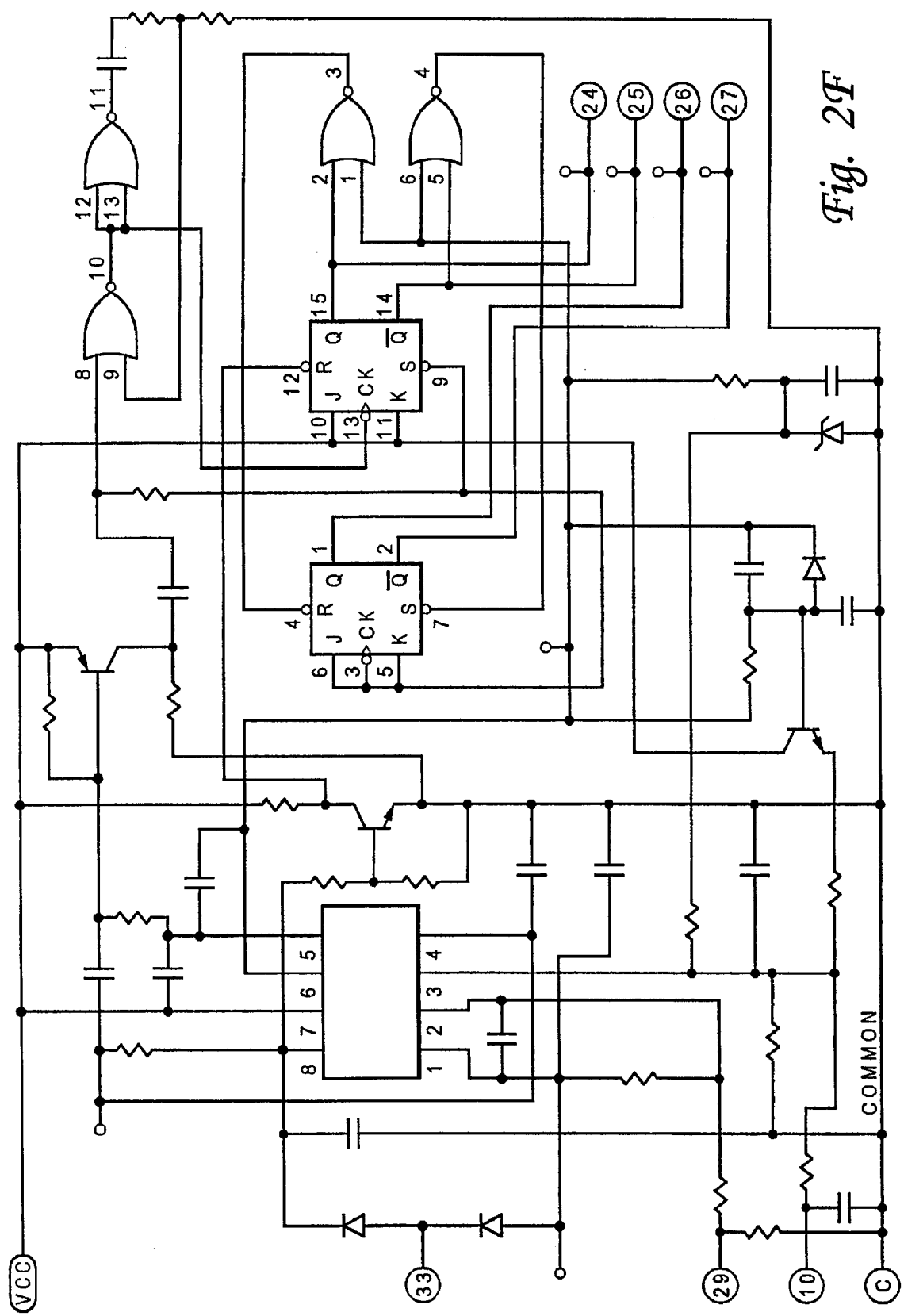
FIG. 2F is a schematic diagram of bridge drive pulse generating circuits.
Figure 2G:
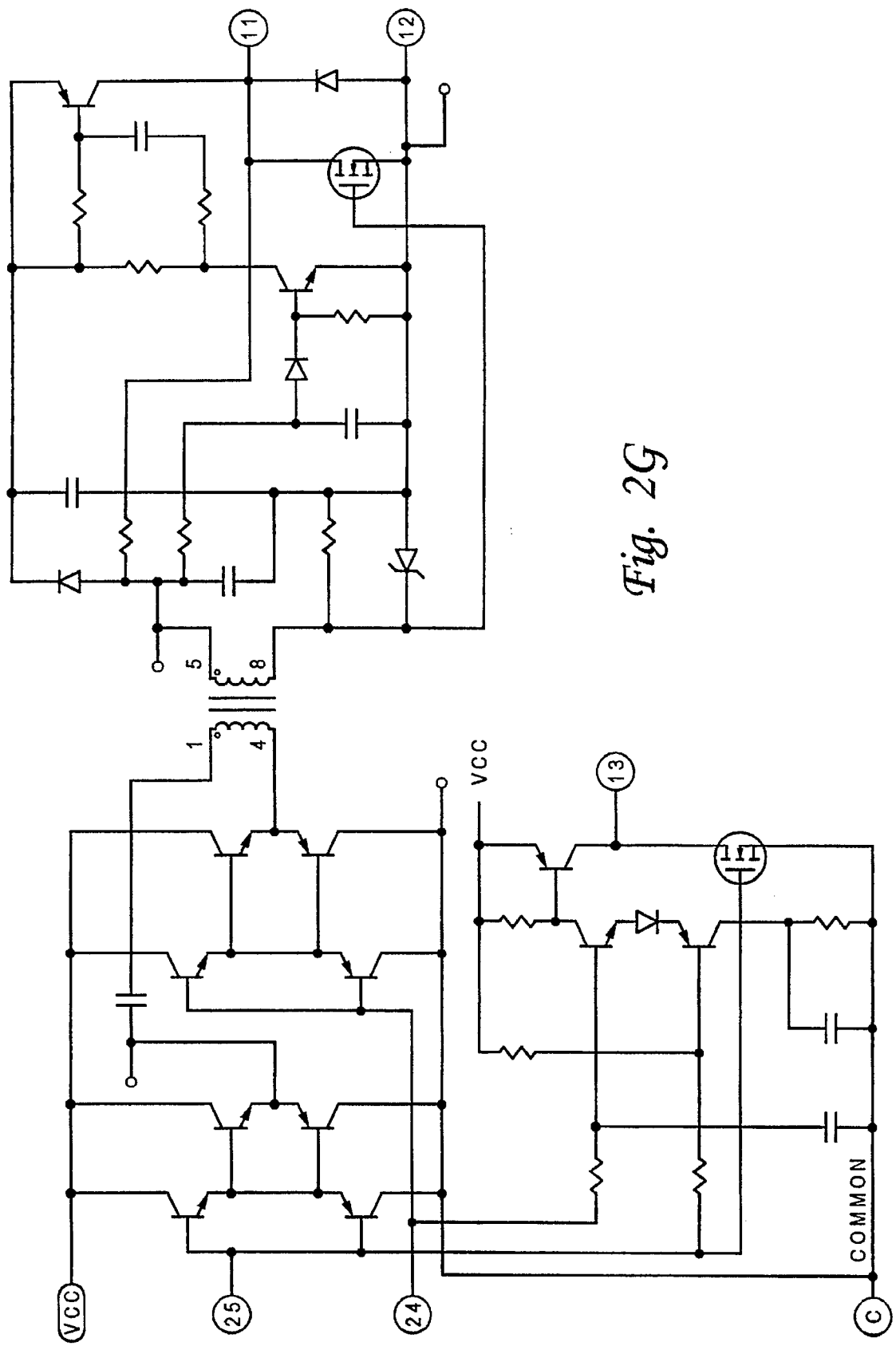
FIG. 2G is a schematic diagram of bridge gate driver circuits.
Figure 2H:
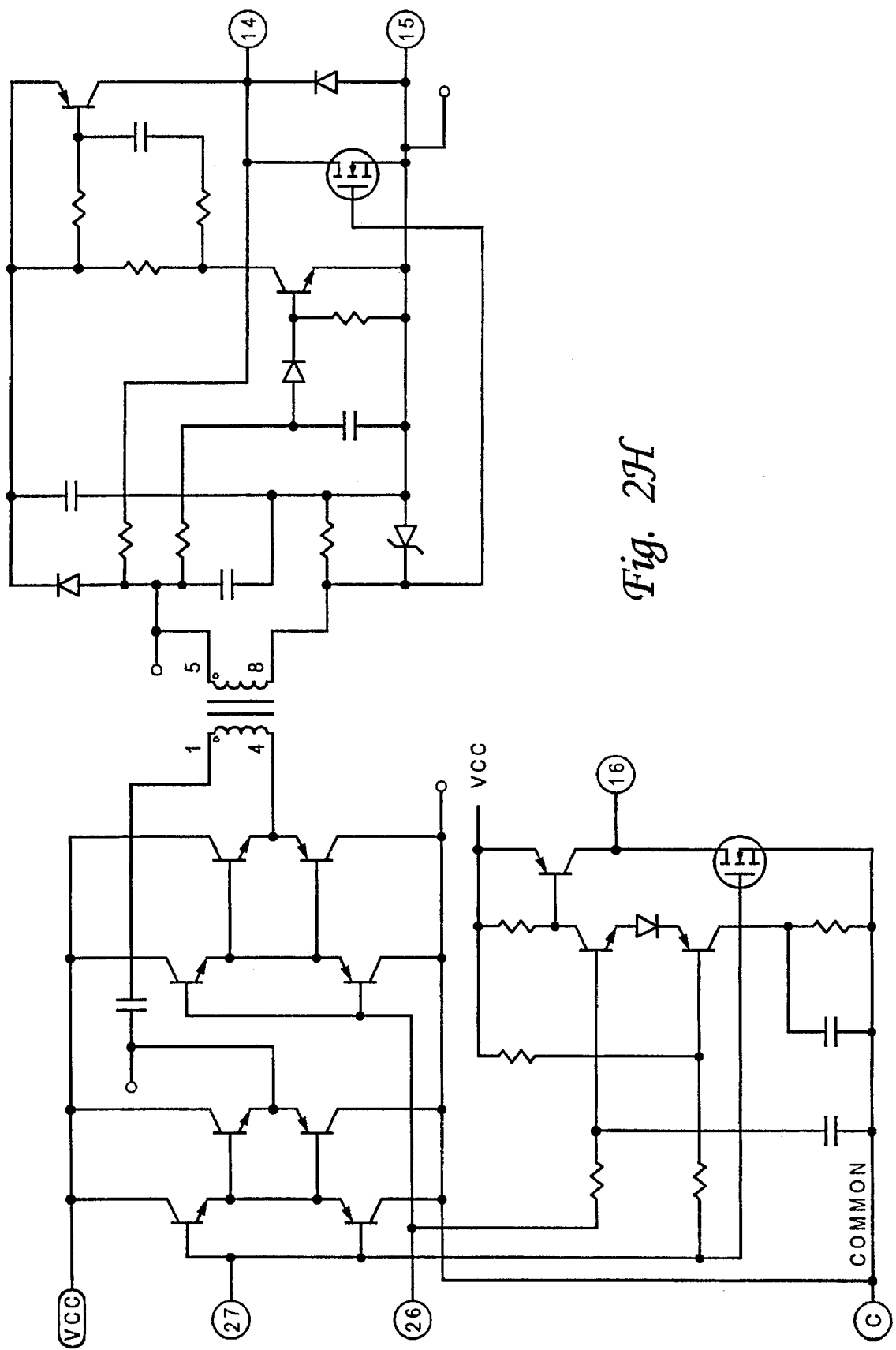
FIG. 2H is a schematic diagram of other bridge gate driver circuits.
Figure 2I:
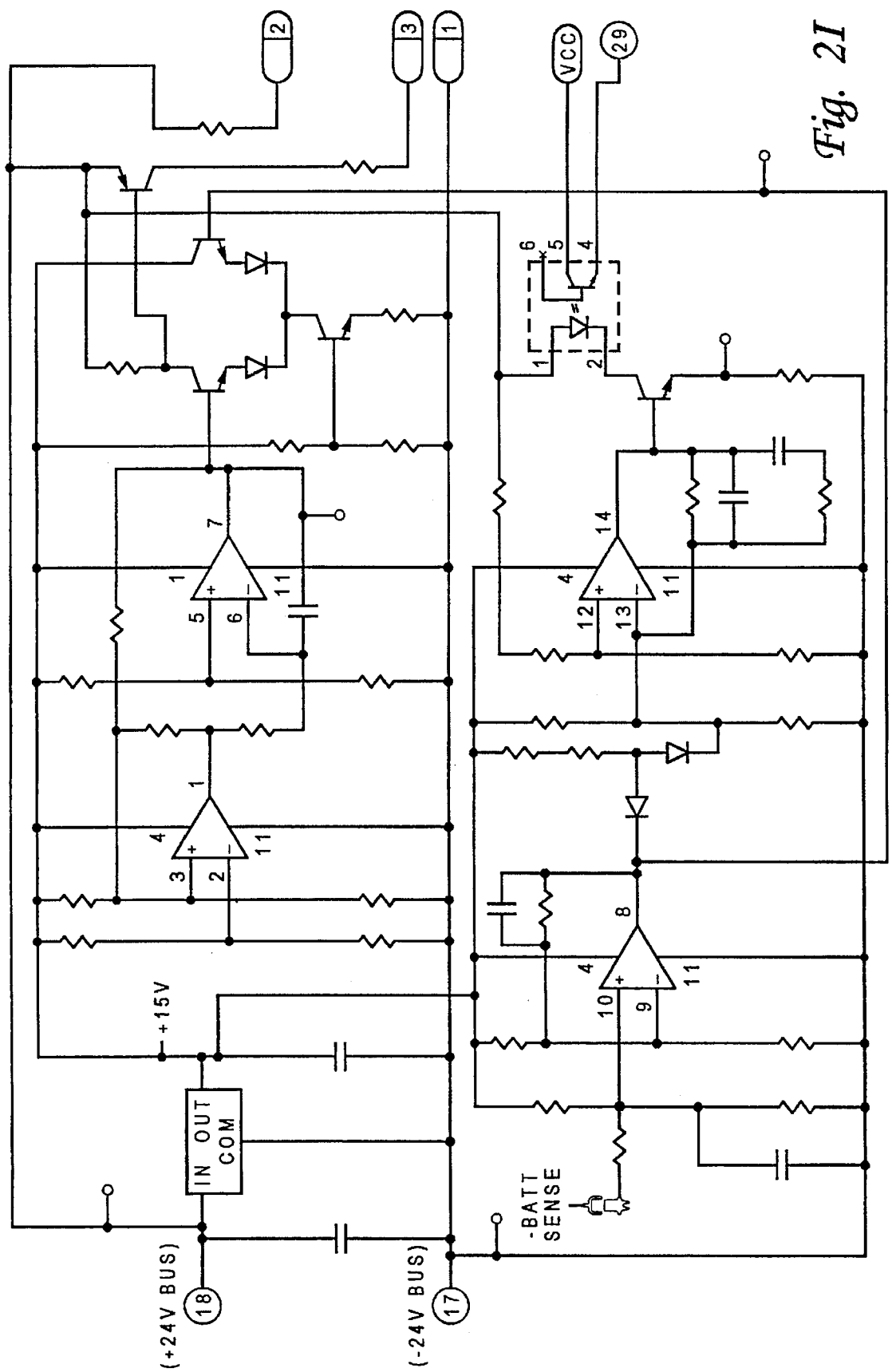
FIG. 2I is a schematic diagram of output and output voltage feedback control circuits.

Now turning to the drawing, and more particularly FIG. 1 thereof, it will be seen to be a simplified block diagram illustrating basic modules of the system. There, it will be seen, are normal source of power 10 which may be referred to as "The Mains" or "Commercial Power." By these expressions is meant a conventional source of alternating current electricity as supplied by a local power company. Connected to power source 10 are: (1) Power Module 11 as by conventional connection 12; (2) control switched logic module 13 as by conventional connections 14/14a; and (3) main power switch 15 (e.g., a conventional wall switch) as by conventional connections 14/14b. Extending from the lower (switched) side of switch 15 is a conductor path 16 by which switched "mains" alternating current is conducted to an input of module 13.

The output of power module 11 is conducted by conventional conductors 17 to battery module 18 where it is connected to main direct current power supply bus 19. As will be observed from the following description, bus 19 supplies normal operating power for energizing the connected loads such as lights 20 and 21. For light 20, such operating power is supplied through other ballast 22, switched logic receiver module 23, and conductor 24; and for light 21, such power is supplied through the combined switched logic receiver/ballast module 25 and conductor 26.

Figure 4:
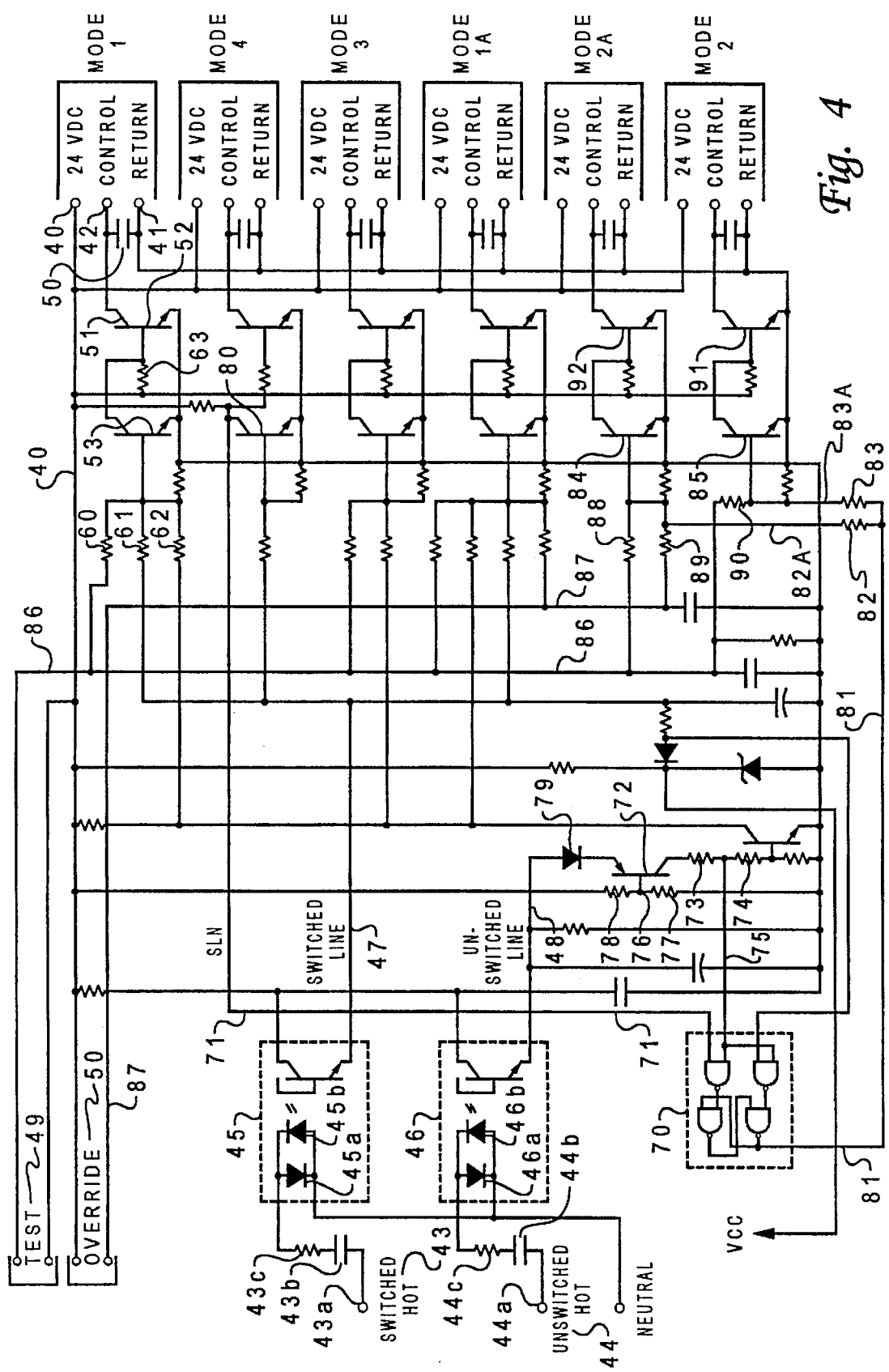
FIG. 4 is a schematic diagram of the control switched logic module of FIG. 1.

As will be more fully shown in FIG. 4, control switched logic module 13 includes a plurality of connections 27 which are identified as Mode 1, Mode 1A, Mode 2, Mode 2A, Mode 3, and Mode 4. If no connections is made to the control input of a ballast, the result is called "Standard Mode", in which the ballast runs continuously. In addition, activating separate inputs to the control switched logic module can initiate what is called test mode, in which a predetermined combination of output states is produced for system testing, or override mode for circumventing the normal programming that is wired into the system during unusual circumstances. The output 27 preferably are brought out to modular quick connect/disconnect connectors so as to facilitate initial connection/reconnection in the field when the equipment is installed.

In operation, output 27 individually are energized with electrical signals that represent the aforementioned modes as determined by the present of input line signals, or the test input signal, or the override input signal. Thus, Standard represents a condition in which a light is continuously on with no control applied and no operating control signal is connected to operate the light.

Mode 1 represents a mode in which a light is controlled by a wall switch or the like. If the switch is on, the light will remain on when mains power is lost. If the switch is off, the light will turn on when mains power is lost.

Mode 1A represents a mode which is similar to that of Mode 1 except that provision is made for an override switch so that the light can be turned on at any time by closing the override switch.

Mode 2 represents a mode similar to Mode 1 except that the light does not automatically turn on when mains power is lost. If the switch is on, the light will remain on during a power failure, and if the switch is off, the light will remain off during such power failure.

Mode 2A represents a mode in which operation is the same as for Mode 2 except that provision is made for an override switch so that the light can be turned on at any time by closing the override switch.

Mode 3 represents operation in a standby mode according to which the light is normally off and turns on when the mains power is lost. It does not include a switch in its input.

Mode 4 represents operation in a non-emergency mode according to which a light is controlled by a wall switch. The light will be on when the switch is closed but is turned off during power failure.

Test is a condition such that when a test switch is closed, all mode outputs except that for Mode 4 will call for lights to be on, regardless of other control inputs.

To illustrate interconnection of modules to selected ones of mode-representing connectors 27, three representative control paths 28, 29 and 30 are shown. These paths include arrows 28a and 29a which represent connectors that can be selectively connected to any of mode representing connectors 27 to impart a corresponding mode of control to lights 20 and 21 through modules 23 and 25. The remaining illustrative path 30 is shown to represent one or more additional connections to other modules such as those for timing, diming and load shedding that are described in the above-mentioned co-pending applications.

The circuits of switched logic module 13 provide for multiple connections to be made to any one or all of the mode-representing outputs, with individual lighting units each having control input and control output modular connectors that allow one unit to be chained to the output of another unit rather than all units having to be individually connected to the switched logic module. Thus, both connections 28a and 29a could be made to the same control mode-representing connector in which both would operate in identical modes.

Now turning to FIGS. 2A–2I, the schematic diagrams of the power module 11 are shown. Those diagrams and circuits are described in co-pending U.S. patent application Ser. No. 08/457,394 entitled "Phase Controlled Bridge" filed on even date herewith; and to avoid needless repetition, the description thereof is incorporated herein by reference.

Figure 3:
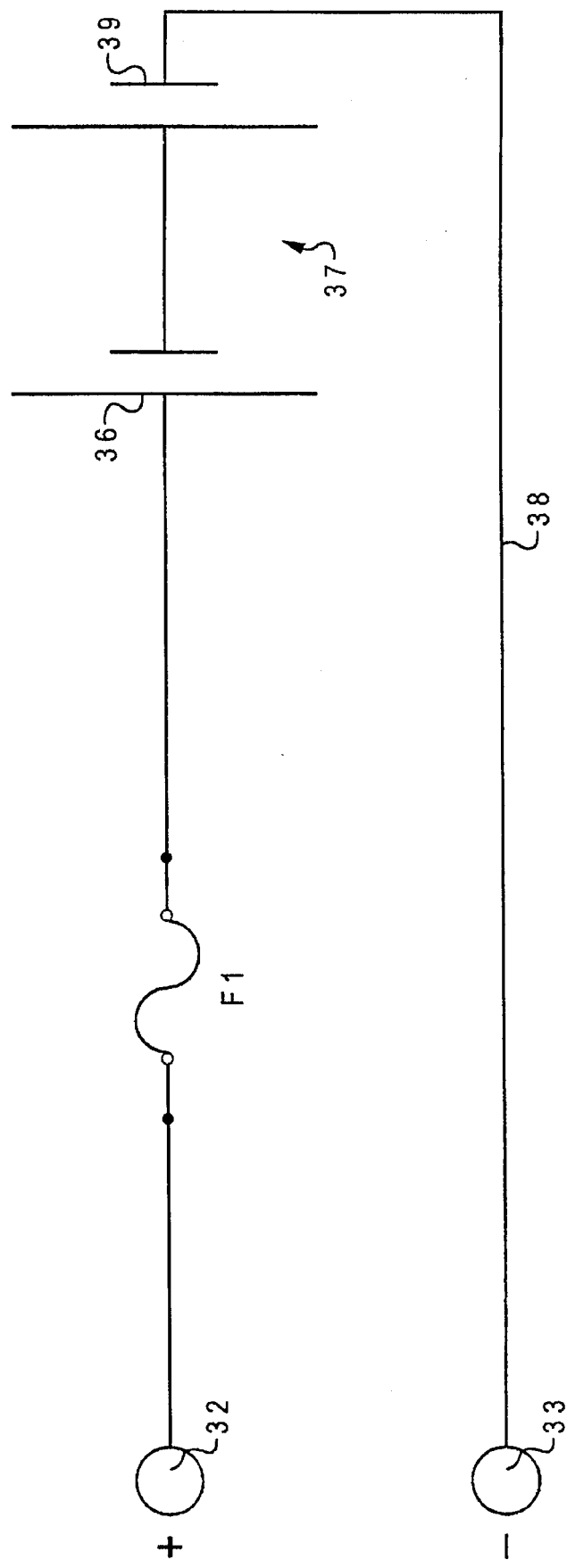
FIG. 3 is a diagram of the battery module of FIG. 1.

FIG. 3 illustrates the battery module and shows positive and negative terminals 32 and 33 respectively. These terminals 32 and 33 are connected to conventional conductors to form d-c bus 19 (FIG. 1). They are also connected to corresponding terminals of power module 11 (FIG. 2). Conductors 34 and 35 connect terminal 32 through conventional fuse F1 to the positive terminal 36 of battery 37, while conventional conductor 38 connects negative terminal 33 to negative terminal 39 of battery 37.

FIG. 4 shows a schematic diagram of the circuits that are preferred for control switched logic module 13. However, before proceeding to a detailed description of module 13, a further general description of its purpose and operation may be helpful. Module 13 is a system component which generates control signals that are suitable for controlling operation of loads, e.g., lighting ballasts through controllers having low level switching control input provisions. As described above, the switched logic modules generate control signals which correspond to all of the defined control modes for lighting systems, with all being available at the same time, and with each mode signal appearing on a separate modular jack. The module thus allows users of the system to operate any selection of lights in any control mode desired simply by plugging the control lines to individual lights or groups of lights into the jack which supplies the appropriate signal for the desired mode. This makes an initial setup of any system a simple matter that can be accomplished in the field at the time of installation, and which can easily be modified at any later time when a need for revision has become apparent. By using standard telephone modular components for making the connections, advantage is taken of the ready availability of cables and adapters of various types that are used with telephones.

In order to facilitate compliance with applicable electrical codes, the physical form of the preferred embodiment of the control switched logic circuits is as small module that can be readily attached to a standard junction box cover plate, with the line voltage (e.g., mains) connections being made with flexible leads that emerge from the back of the module and are then contained entirely within the junction box. All of the remaining connections are at low voltage and can be carried on modular cables similar to those used for telephone connections. Jacks which accept the modular cables are accessible on the exposed surface of the module, thus minimizing the amount of installation work required of installing electricians. Other command inputs are the override switch and the test switch, these being in low voltage circuits that require no special handling.

Reference is now again made to FIG. 4. At the right hand side of the figure there are shown the output terminals for the six above-described modes 1, 1A, 2, 2A, 3 and 4. These outputs follow a similar pattern in that each of these output includes a 24 volt d.c. terminal such as terminal 40, a negative (or return) terminal such as terminal 41 and a control terminal such as terminal 42. At the left side of the figure, there are shown an input signal receiver 43 for switched hot line and input signal receiver 44 for an unswitched hot line. Input connections are made as illustrated by terminals 43a and 44a which extend respectively through coupling capacitors 43b and 44b and current limiting resistors 43c and 44c to conventional optical isolator modules 45 and 46. As will be observed, through the inclusion of inverse parallel light emitting diodes 45a/45b abd 46a/46bm provision is made for response to both half cycles of the alternating current supply. Thus, signals appearing on switched line output 47 and unswitched line output 48 are representative respectively of those two conditions.

In addition to the switched and unswitched line inputs appearing at the left side of FIG. 4, there are also included near the top of the figure a test switch or push botton 49 and an override switch or push button 50 which respectively evoke those actions when closed.

Reference again to the right hand side of FIG. 4 reveals that connected to each of the aforementioned control output terminals (e.g., terminal 42) there is connected a by-pass capacitor (e.g., capacitor 50) and the collector (e.g., collector 51) of a control line driver transistor (e.g., transistor 52). The receiver modules that are to become connected to these control output terminals are responsive to an essentially open circuit (floating) condition at the control output terminals (e.g., terminal 42) to cause the associated light(s) to turn on. Thus, when a control input to any of the lighting control devices is allowed to be effectively open circuited and thus to assume a voltage equal to its open circuit value, it is the function of the circuit to cause the associated light to turn on. Conversely, when a control input is held at a low voltage, the connected control circuit (e.g., a connected switched logic receiver) causes the light to turn off. Thus, when one of the aforementioned control output transistors (e.g., transistor 52) is conducting, the lights that are being controlled by the control line it drives will be turned off, and when any of the inputs of the associated first stage transistor as described below (e.g., transistor 53) are driven high by logic signals and the associated output transistor (e.g., transistor 52) is not conducting, the associated lights will be on.

Further reference to FIG. 4 reveals the presence of logic circuits associated with each pair of output transistors (e.g., transistors 52/53). Thus, there are provided simple resistive-wired OR networks feeding inputs of output control line drivers (e.g., resistors 60, 61 and 62 connected to the base of output control line driver transistor 53).

Each control line driver comprises an output transistor (e.g., transistor 52) and a phase inverting first stage transistor (e.g., transistor 53). The base of output transistor 52 is connected to d.c. supply voltage through resistor 63 thus providing a continuous base drive to maintain the transistor in a conducting state except when the base drive is diverted by the conduction of the first stage transistor 53.

Conduction of first stage transistor 53 occurs when base current is delivered through any of the three connected resistors 60, 61 and 62. These resistors are thus seen to form a three input OR gate in which voltage applied to any one of the resistors will cause the same effect, namely, to turn the first stage transistor on (e.g., transistor 53), divert current from the base of the connected output transistor (e.g., transistor 52), thus turning it off. The output transistor collector current which serves to cause the output control line to be held at a relatively low voltage, is then stopped, allowing the associated control line to assume its open circuit voltage value. Accordingly, driving any of the OR connected inputs to one of the driver transistors can cause the associated light(s) to be turned on. It will thus be seen that the resistive wired OR circuits are designed to cause the desired system events to occur in response to the various possible combinations of logic inputs. These desired system events are as defined above for modes 1, 4, 3, 1A, and 2A therein described. However, it will be observed that the circuits for Mode 2 are somewhat different since the functions defined for Mode 2 are not readily handled through resistive OR networks.

It will be recalled that lights controlled through the Mode 2 control line must remain in their switched controlled state whether on or off, when the mains power fails. The difficulty then is that when the mains voltage is not available, there is nothing to normally indicate to the control switched logic module what the state of the line switch may be. It is therefore necessary for the module circuits to remember what the state of the switch was just before the mains voltage failed. This is accomplished by a commercially available CMOS gate package 70 that contains four two-input NAND gates. In the preferred embodiment such CMOS package 70 is a CD4093 type whose internal schematics are as shown in FIG. 4.

In considering the operation of CMOS package 70, it may be helpful to recall that a NAND gate is one in which all of the inputs must be high in order for the output to respond, and being an inverting gate, as indicated by the N before AND, the output is inverted; that is to say, low, when all inputs are high. When such a gate is used as a flip-flop, it actually functions in negative logic, and a positive AND gate becomes a negative OR gate, which can be stated as a gate in which either of the inputs being low, will result in the out being high.

Referring again to the schematic for package 70, it will be observed that two of the gates are cross-connected to form a flip-flop which can be set or reset by causing the remaining input of either gate, both of which must be normally maintained at the high state, to be momentarily driven low, whereupon the output of that gate will go high, with the result that both inputs of the other gate are then high, resulting in the output of the other gate going low. That output being connected to one of the inputs of the first gate will cause the output of the first gate to assume the high logic state without the need for the momentary low drive to the remaining input to be maintained thus, the circuit is latched in a stable condition. The other two gates of the four are employed to enable logic signal SL appearing on switched line 47 and logic signal SLN (SL NOT) appearing on SLN line 71 to be passed through to the set and reset inputs of the flip-flop as long as the signal on unswitched line (USL) 48 is high. A portion of the collector signal from transistor 72 passing through divider network 73/74 is conducted via path 75 to one input of each of two gates so that whichever gate has the other input also high will generate an output low, which in turn sets or resets the flip-flop. Thus, the condition of the line switch at the moment of power failure is remembered and a signal indicative thereof is provided by the flip-flop of CMOS package 70.

In considering operation of the circuits, it is important to note that the active flip-flop gate be disabled as soon as the mains voltage begins to diminish and before the switched logic (SL) signal is impaired; and consequently, transistor 72 be connected as a common base amplifier in which its base is biased positive by the voltage appearing at the junction 76 of the voltage divider comprised of resistors 77 and 78 such that current flowing from unswitched line conductor 48 will be passed through diode 79 and transistor 72 only so long as the USL voltage on conductor 48 is more positive than the transistor base voltage which appears at junction 76. In this way, the unswitched line voltage on conductor 48 is the first to fall when the mains voltage begins to fail, and the switched line (SL) and switched line not (SLN) signals will remain valid for indicating the state of the wall switch until after the USL signal on conductor 48 has gone low, thus avoiding corrupting the switch state information represented by the SL and SLN signals as mains voltage disappears.

It should be noted that the switched line not (SLN) signals are inversions of the switched line (SL) signals and are produced by the inversion of the SL signals through transistor 80. It should also be noted that the current transfer ratios (CTR's) of the two opto-couplers 45 and 46 should be matched so that the one having the higher current transfer ratio should be employed as the opto-coupler producing the switched line (SL) signal, i.e., opto-coupler 45.

It should also be noted that the time constant of opto-coupler 45 (i.e., the one supplying the switched line SL signal) should be longer than the time constant of the remaining opto-coupler so that maintaining a valid SL signal until after the USL signal loss has disabled the gates of package 70 will operate properly when mains power is lost abruptly.

Further reference to FIG. 4 reveals that an output 81 of flip-flop 70 is conducted to logic input resistors 82 and 83 and thence via conductors 82A and 83A to the bases of first stage transistors 84 and 85 which act as logical inputs thereto as described above for logical inputs to transistors 53 and 80. Accordingly, provision is made for logical inputs for operation according to modes 2 and 2A.

The other inputs to transistors 84 and 85 are generated by the test and override inputs to the switched logic module, as follows. The test switch 49 and the override switch 50, which are external to the module, each have one side connected to the 24 volt supply carried on line 40, with the test switch, when closed, supplying 24 volts to the test signal line 86, and the override switch, when closed, supplying 24 volts to the override signal line 87. These signals function in the same way as was previously described with respect to resistors 60, 61 and 62, and transistor 53, except that here the override signal passes through resistor 89 to the base of transistor 84, causing transistor 90 to be turned off, and the test signal passes through resistor 88 also to the base of transistor 84, also causing transistor 90 to be turned off. Similarly, the test signal on line 86 passes through resistor 92 to the base of transistor 85, thus causing transistor 91 to be turned off. As previously seen, turning any output transistor off allows its output line to go high, which then permits any lighting units that are connected to said output lines to be turned on.

Figure 5:
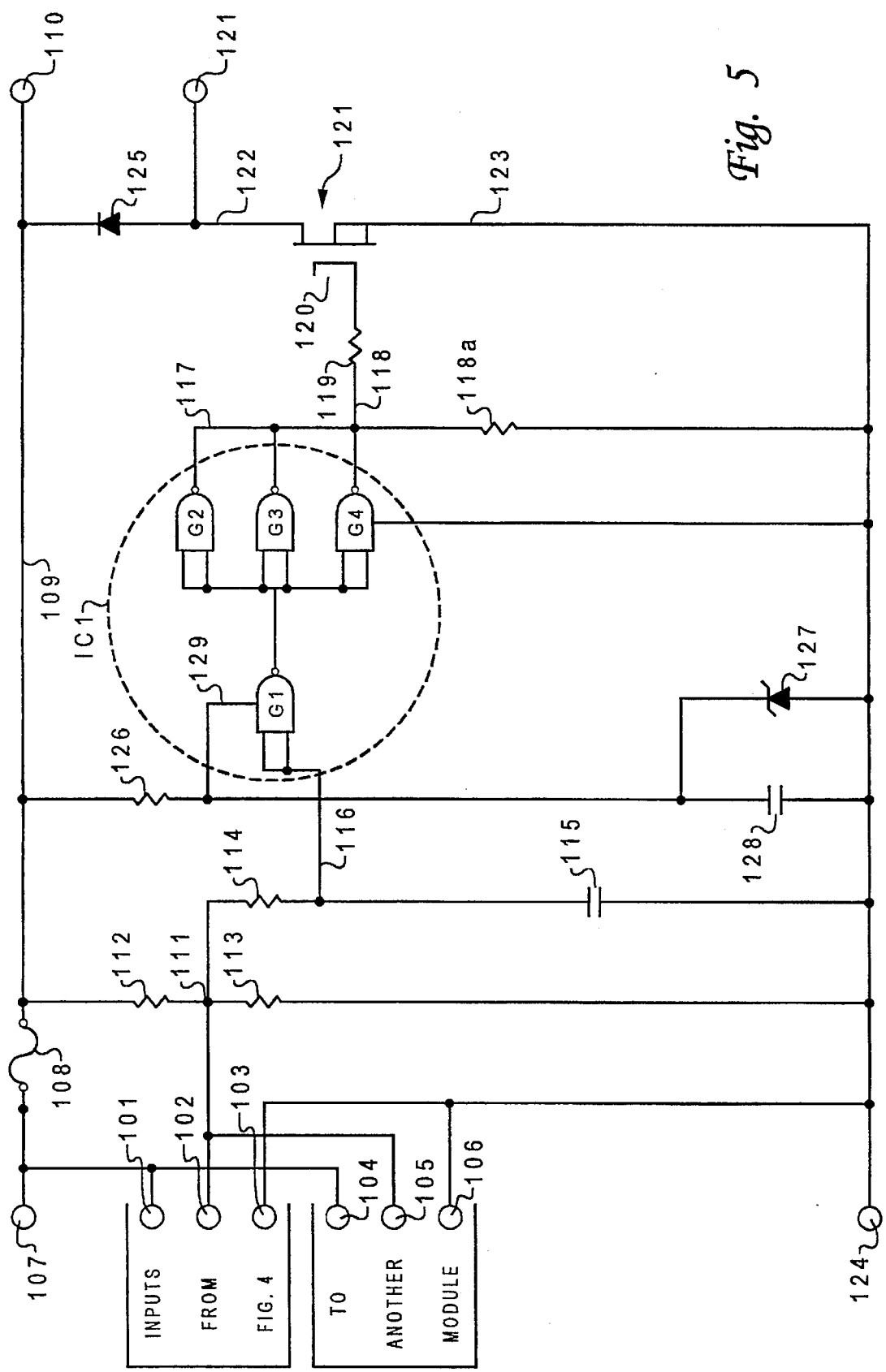
FIG. 5 is a schematic diagram of the switched logic receiver module of FIG. 1.

As mentioned above, FIG. 5 is a schematic diagram of the switched logic receiver module 23 of FIG. 1. It is a lighting system module that permits multi-mode control of ballasts that are not equipped with low level control capability of integrated ballasts such as those described below in connection with FIG. 6. Thus, provision is made for operation with conventional ballasts such as those that may be included in existing systems. The circuits of FIG. 5 are adapted for controlling a d.c. load such as a d.c. input ballast using a power MOSFET as the power switching element. In addition, a CMOS gate array is used to provide a control input to the gate of the MOSFET, with the added function of supressing line noise and providing an unambiguous control signal, even though the input voltage may not have a clearly defined and rapid transition, by selecting for the CMOS gate one that is also a Schmitt trigger. In addition, passive components form a low pass filter at the control input to supress impulse noise that may be induced on the control line from outside sources, and the trigger action of the CMOS gate/trigger then functions to speed up the transition which is intentionally slowed by the low pass filter.

Now turning specifically to FIG. 5, it will be observed that the circuits are adapted to receive any one of the above-described mode control signals as determined by the particular one of the mode-representing connectors 27 to which connection is made. For example, if the switched logic receiver module of FIG. 5 is to be operated in Mode 1, connections 101, 102 and 103 are made respectively to FIG. 4 terminals 40, 42 and 41.

One of the features of the invention lies in the fact that the switched logic receivers may be chain connected in parallel so that a large number of those operating in the same mode can be connected together without having to run separate control and power conductors back to the control switched logic module (e.g., the module of FIG. 4). Thus, it will be observed that another set of terminals 104, 105 and 106 is provided at the left side of FIG. 5 and just below input terminals 101, 102 and 103. This latter set of terminals 104, 105 and 106 are provided for connecting another similar module operating in the same mode and are thus seen to be internally connected, 101 to 104, 102 to 105, and 103 to 106. At the top left there is shown an optional d-c positive conductor terminal to provide another path for energizing the circuits. From there, positive d-c voltage is extended through circuit protection fuse (or circuit breaker) to conductor 109 and thence to output terminal 110 provided for connection of a conventional ballast (not shown).

Now returning to the control input terminal 102, a path leads therefrom to junction 111 between voltage dividing resistors 112 and 113 that establish a normal voltage of about one-half that of the d.c. bus in the absence of a control input signal on terminal 102. Thus, since in this preferred embodiment the voltage of the d.c. supply is nominally 24 volts, the voltage appearing at junction 111 would be about 12 volts. When terminal 102 is switched to its low state in which its voltage drops to a value between 0 and 1 volt, it drains about one quarter milliampere from d.c. bus 109 through resistor 112.

Resistor 114 and capacitor 115 form a low pass filter to smooth out unwanted inpulse noise that may be inpulse noise that may be induced on the control line from outside sources. Then, after smoothing by the low pass filter, the input from junction 111 passes via path 116 to the inputs to gate G1. When the signal is high, it presents a logic high signal to that input which is inverted by gate G1 before being applied to the inputs to gates G2, G3 and G4 which are connected in parallel at both input and output. When passing through gates G2–G4, the signal is again inverted so that it assumes a condition similar to that of the signal at junction 111. Thus, the output from IC1 is representative of the signal at the input 102, and such output from IC1 is conducted via path 117, path 118 and resistor 119 to gate 120 of power MOSFET 121 where it controls the passage of current therethrough. When the signal on the gate 120 is high, MOSFET 121 conducts, thereby completing a return circuit for the connected ballast (not shown) through terminal 121, path 122, power MOSFET 121 and conductor 123 to return terminal 124. On the other hand, when the input signal at junction 111 is low (due to a change on the input terminal 102 from high to low), voltage appearing on gate 120 of power MOSFET 121 is driven low, thus cutting off flow of current through MOSFET 121 and correspondingly shutting off power to the connected ballast. Resistor 118a is seen to be interposed between the outputs of gates G2–G4 to provide a return path to ground for current from the gate outputs.

Diode 125 is provided to supress voltage transients that may occur at the moment of switching off the power to the load due to inductance that may be present in the load. The remaining components act conventionally. Thus, voltage-dropping resistor 126 is provided in conjunction with zener diode 127 and by-pass capacitor 128 to establish the correct supply voltage for connection to IC1.

Figure 6:
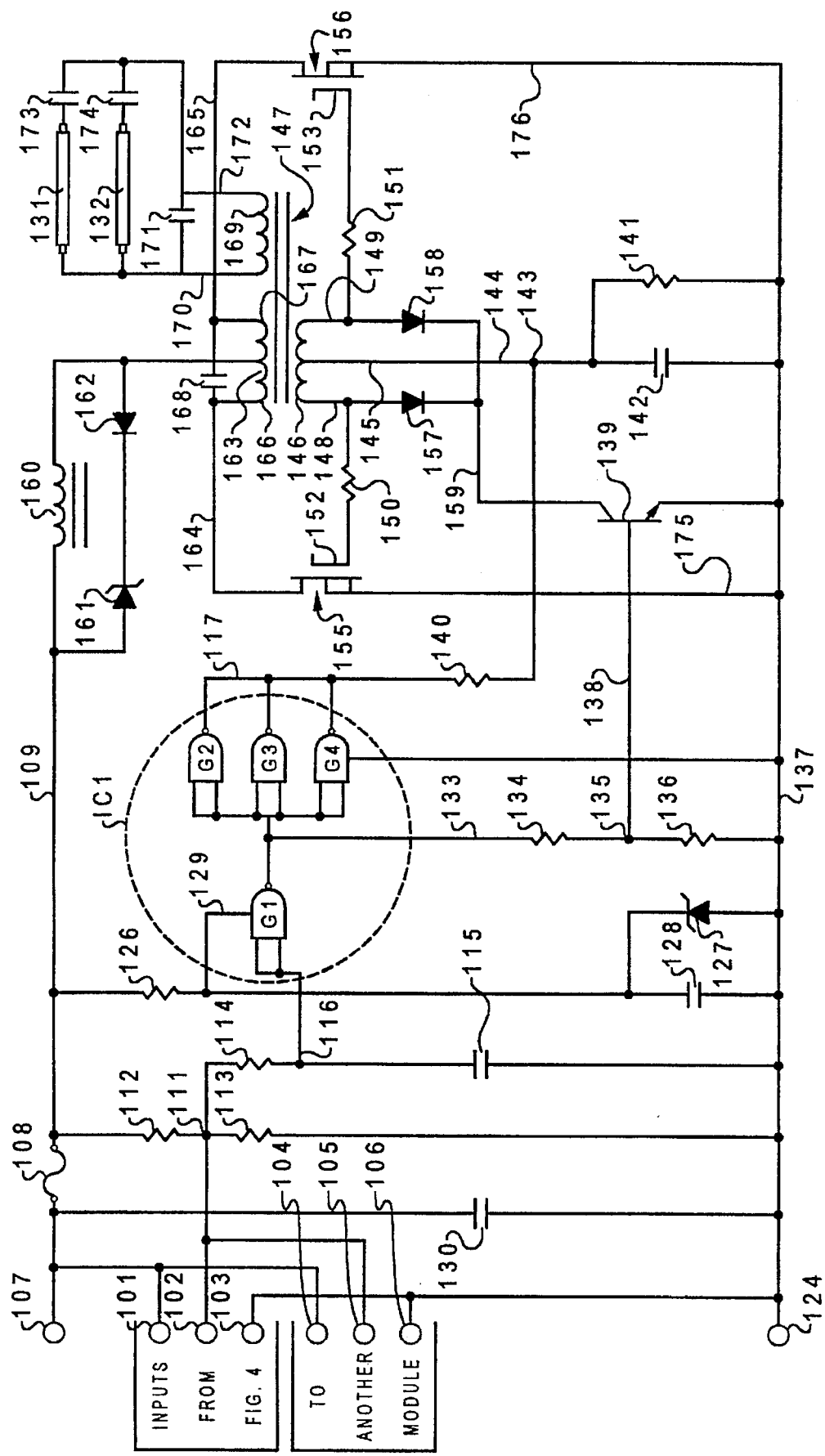
FIG. 6 is a schematic diagram of the ballast with switched logic receiver of FIG. 1.

Reference is now made to FIG. 6 which is seen to illustrate the integrated controlled ballast 25 of FIG. 1. There, the left-hand portion of the diagram is identical to that of FIG. 5 (with the exception of capaciror 130 which is merely a smoothing/filtering capacitor) and so corresponding parts have been designated with corresponding numerical identifiers. There are, however, shown at the right hand side of FIG. 6 the circuits for an integrated ballast which energizes a pair of conventional fluorescent lamps 131 and 132. It should be noted at this point that although a pair of lamps are shown, the circuits hereof are also applicable for energizing a single lamp, or, with provision of a larger capacity ballast transformer, three or more such lamps.

Referring further to the center and right hand side of FIG. 6, components and interconnecting circuits in addition to those of FIG. 5 are seen. Thus, a path is extended from the output of gate G1 via path 133 through resistor 134 and via path 138 to the base of transistor 139. Thus the voltage appearing on junction 135 is limited by the base-emitter diode drop in transistor 139. Resistor 136 serves to carry to common 137 any leakage currents that might arrive at the gate of transistor 139 and so ensure that the latter will turn completely off when so required. As will be later described, transistor 139 is thus turned on and off by gate G1; and in turning on and off, transistor 139 correspondingly turns on and off lights 131 and 132.

A voltage dividing and capacitor by-pass configuration is seen to be connected to the outputs of gates G2–G4 as by path 117. Such voltage dividing and by-pass network is comprised of resistors 140 and 141 the junction of which is by-passed to ground by capacitor 142. Junction 143 is connected by path 144 to center tap 145 of control feedback winding 146 of transformer 147; and connections are made via paths 148 and 149 respectively through resistors 150 and 151 to gates 152 and 153 of power N channel MOSFET transistors 155 and 156. Additional paths are respectively extended via gate voltage clamping diodes 157 and 158 and conductor 159 to the collector of control transistor 139.

Now referring to the top of FIG. 6, it will be observed that there is connected to d.c. bus 109 a current feed inductor across which are connected zener diode 161 and ordinary diode 162. The purpose of these diodes is to limit transient voltages that otherwise might become excessive as the inductor functions to provide current to the primary winding 163 of transformer 147. Paths 164 and 165 are also seen to exist between the drains of power MOSFET transistors 155 and 156 and opposite ends 166 and 167 of primary winding 163. Resonating capacitor 168 is interconnected between paths 164 and 165 to assist is oscillation as is described below. The left terminal of secondary winding 169 of transformer 147 is seen to be connected via path 170 to one terminal of resonating capacitor 171 and the left hand terminals of lamps 131 and 132; while the right terminal of secondary winding 169 is seen to be connected via path 172 to the remaining terminal of resonating capacitor 171 and to the right hand terminals of lamps 131 and 132 through capacitors 173 and 174. In addition to the foregoing, it will be noted that several return paths are provided to the negative (or ground conductor) 137. These include paths 175 and 176 which complete the operating circuits for power MOSFET transistors 155 and 156.

Operation of the foregoing circuits will now be described. As will be observed by those skilled in the art, the circuits comprise a current fed parallel resonant push pull inverter with the primary of the transformer 147 being fed by current feed inductor 160 which supplies a relatively steady d.c. current to the center tap of transformer primary winding 163. The pair of power MOSFET transistors 155 and 156 together with the above described resonating capacitors and related components provide a relatively high frequency oscillator coupled through the transformer secondary 169 to the load (e.g., lights 131/132). Operating frequency is determined by the inductance of the transformer in conjunction with the resonating capacitors.

Operation of the foregoing circuits advantageously exploits characteristics of the current fed oscillator which is one in which the switching devices (e.g., MOSFET) operate in a switching mode (as contrasted with a linear or quasi-linear mode as would be the case in a simple sine wave oscillator) by by current feed inductor 160 which permits the center tap of the primary winding of transformer 147 to operate at whatever waveform of voltage variation that may be required to permit the end of the winding that is conne-acted to the MOSFET that is in conduction at a given time to remain at a very low potential with respect to the circuit common as the voltage from end to end of the primary is caused to vary with time as the oscillating cycle progresses.

Conduction of the MOSFET transistors 155/156 is controlled by a feedback voltage that is produced across the control feedback winding 146. The winding center tap 145 is caused to remain at a fixed bias voltage set to be approximately equal to the threshold voltage of the MOS-FETs so that as the voltage on the feedback winding cycles through its sinusoidal variation, the conduction of each MOSFET occurs for essentially one half ot eht ime, with conduction beginning and ending as the voltages on the ends 166 and 167 pass through the threshold voltage level.

The foregoing oscillation is enabled or disabled by the auxiliary circuits comprising diodes 157/158, transistor 139, Schmitt trigger gate circuits IC1 and the above-described connected elements. Low level input terminal 102 is the point at which control of the oscillation is accessed. With no connection to terminal 102, the voltage which appears at the junction 111 is equal to approximately 12 volts (a fraction of the supply voltage as determined by the values of voltage divider resistors 112 and 113. This same voltage, after passing through a low pass filter comprising resistor 114 and capacitor 115, is appliedk to the inputs of G1 which then has a logic high input voltage and as a result produces an output voltage on conductor 133 which is logic low. IC1 will be recognized to be a Schmitt trigger in which the gates also have internal positive feedback which causes the output of each gate to exhibit a very fast transition even though the input waveform may have much longer rise and fall times. The low logic signal is applied to the remaining gates G2–G4 causing their outputs to be high. This is the normal operating state for the oscillator, since in this condition, the outputs of gates G2–G4 are nearly equal to the IC1 supply voltage supplied through resistor 126 as controlled by zener diode 127. Such voltage is divided by the voltage divider comprising resistors 140 and 141, and the correct voltage is then conducted from junction 143 through path 145, the control feedback winding 146 and resistors 150 and 151 to the gates 152 and 153 of MOSFET transistors 155 and 156 thus biasing them to their conducting condition and resulting in circuit oscillation. The bias voltage developed at junction 143 will be slightly greater than the threshold voltage of the MOSFET transistors 155 and 156, with the optimum value for best operation found by observing the voltage waveform at the center tap of output transformer primary 163, and adjusting the bias to be on the high side of the value that causes the minimum amount of voltage spike at the time of transition of current from one MOSFET to the other, while the circuit is operating with normal load.

When it is desired to discontinue oscillation (and consequently turning off the lights 131/132, the voltage appearing at input terminal 102 is taken low (by circuits previously described in connection with the foregoing figures). When that occurs, the output of gate G1 goes high and the outpouts of gates G2–G4 become low. The high output of gate G1 causes a current to flow through resistor 134 to the base of control transistor 139, thus forward biasing its base-emitter junction and causing transistor 139 to conduct. The resulting current is communicated via diodes 157 and 158 and results in a lowering of the voltage on the gates of MOSFET transistors 155 and 156 thus turning them off and stopping oscillation of the above-described oscillatory circuits. At the same time, the low output of gates G2–G4 removes the bias voltage that is otherwise applied to the feedback winding center tap, thus reducing the amount of conduction required by transistor 139 and correspondingly reducing the current drain on the positive supply voltage as long as oscillation is disabled. Since voltage to the lamps 131 and 132 is dependent upon such oscillation the lamps are effectively extinguished.

It will now be evident that there has been described herein, a modular uninterruptible lighting system that exhibits a variety of features and advantages including provision for operation over an extended range of input voltages.

Although the inventions hereof have been described by way of a preferred embodiment, it will be evident that other adaptations and modifications may be employed without departing from the spirit and scope thereof. For example, connectors other than quick connect/disconnect connectors could be employed for the outputs from the control switched logic module.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. An uninterruptible lighting system comprising:
   (a) A plurality of lights and a source of normal energizing electric power for said lights;
   (b) Means including receiver means interconnected with each of said lights for conditioning said lights to any selected one of a plurality of states;
   (c) Control means selectively conditionable to produce individual control signals individually representing said plurality of states;
   (d) Control signal communication means interconnecting said control means and said receiver means for communicating said control signals from said control means to said receiver means; and
   (e) Means including said receiver means effective when said source of normal energizing power is interrupted for severally conditioning said lights to states severally represented by selected ones of said plurality of states.

2. An uninterruptible lighting system according to claim 1 wherein said receiver means is modular.

3. An uninterruptible lighting system according to claim 1 in which said control means and said receiver means are each modular.

4. An uninterruptible lighting system according to claim 1 further including normal switch means connecting said normal energizing electric power to said lighting system and in which one of said individual control signals individually representing said plurality of states is a first signal, said first signal being representative of a condition that when said normal switch means is in an on condition and said normal energizing electric power fails, for instructing a light to remain on, and when said normal switch means is in an off condition and said normal energizing electric power fails for instructing a light to turn on.

5. An uninterruptible lighting system according to claim 4 further including override switch means for overriding said normal switch means, said override switch being effective when in an on condition to cause said first signal to represent a light on condition irrespective of the condition of said normal switch means.

6. An uninterruptible lighting system according to claim 1 further including normal switch means connecting said normal energizing electric power to said lighting system and in which one of said individual control signals individually representing said plurality of states is a second signal, said second signal being representative of a condition that when said switch means is in an on condition and said normal energizing electric power fails, for instructing a light to remain on, and when said switch means is in an off condition and said normal energizing electric power fails for instructing a light to stay off.

7. An uninterruptible lighting system according to claim 6 further including override switch means for overriding said normal switch means, said override switch means being effective when in an on condition to cause said second signal to represent a light on condition irrespective of the condition of said normal switch means.

8. An uninterruptible lighting system according to claim 1 in which one of said individual control signals individually representing said plurality of states is a third signal, said third signal being representative of a condition that when said normal energizing electric power is on, said lights are off, and when said normal energizing electric power fails, for instructing said lights to turn on.

9. An uninterruptible lighting system according to claim 8 in further including a switch for switching said lights off and on, and in which one of said individual control signals individually representing said plurality of states is a fourth signal, said fourth signal being representative of a condition that when said switch is turned on to energize said lights and said normal energizing electric power is present, said lights are on and when said lights are energized and said normal energizing electric power fails, for instructing said lights to turn off.

10. An uninterruptible lighting system according to claim 1 in which one of said individual control signals individually representing said plurality of states is a fourth signal, said fourth signal being representative of a condition that when said normal energizing electric power is on, said lights are on, and when said normal energizing electric power fails, for instructing said lights to turn off.

11. An uninterruptible lighting system according to claim 1 in further including a switch for switching said lights off and on, and in which one of said individual control signals individually representing said plurality of states is a fourth signal, said fourth signal being representative of a condition that when said switch is turned on to energize said lights and said normal energizing electric power is present, said lights are on and when said lights are energized and said normal energizing electric power fails, for instructing said lights to turn off.

12. An uninterruptible lighting system according to claim 1 wherein said control means is modular.

13. An interruptible lighting system according to claim 12 wherein said control means includes a plurality of selectable output terminals individually representing said plurality of states.

14. An interruptible lighting system according to claim 13 wherein said selectable output terminals are quick-connect, quick-disconnect modular terminals.

15. An interruptible lighting system according to claim 13 further including normal switch means connecting said normal energizing electric power to said lighting system and in which one of said individual control signals individually representing said plurality of states is a first signal, said first signal being representative of a condition that when said normal switch means is in an on condition and said normal energizing electric power fails, for instructing a light to remain on, and when said normal switch means is in an off condition and said normal energizing electric power fails for instructing a light to turn on.

16. An uninterruptible lighting system according to claim 15 further including override switch means for overriding said normal switch means, said override switch being effective when in an on condition to cause said first signal to represent a light on condition irrespective of the condition of said normal switch means.

17. An uninterruptible lighting system according to claim 13 further including normal switch means connecting said normal energizing electric power to said lighting system and in which one of said individual control signal individually representing said plurality of states is a second signal, said second signal being representative of a condition that when said switch means is in an on condition and said normal energizing electric power fails, for instructing a light to remain on, and when said switch means is in an off condition and said normal energizing electric power fails for instructing a light to stay off.

18. An uninterruptible lighting system according to claim 17 further including override switch means for overriding said normal switch means, said override switch means being effective when in an on condition to cause said second signal to represent a light on condition irrespective of the condition of said normal switch means.

19. An uninterruptible lighting system according to claim 13 in which one of said individual control signals individually representing said plurality of states is a third signal, said third signal being representative of a condition that when said normal energizing electric power is on, said lights are off, and when said normal energizing electric power fails, for instructing said lights to turn on.

20. An uninterruptible lighting system according to claim 13 in which one of said individual control signals individually representing said plurality of state is a fourth signal, said fourth signal being representative of a condition that when said normal energizing electric power is on, said light are on, and when said normal energizing electric power fails, for instructing said lights to turn off.

21. An uninterruptible lighting system according to claim 20 in further including a switch for switching said lights off and on, and in which one of said individual control signals individually representing said plurality of states is said fourth signal, said fourth signal being representative of a condition that when said switch is turned on to energize said lights and said normal energizing electric power is present, said lights are on and when said lights are energized and said normal energizing electric power fails, for instructing said lights to turn off.

22. An uninterruptible lighting system according to claim 13 in further including a switch for switching said lights off and on, and in which one of said individual control signals individually representing said plurality of states is a fourth signal, said fourth signal being representative of a condition that when said switch is turned on to energize said lights and said normal energizing electric power is present, said lights are on and when said lights are energized and said normal energizing electric power fails, for instructing said lights to turn off.

23. A modular uninterruptible lighting system comprising:

(a) A plurality of lights and a source of normal energizing electric power for said lights, at least one of said lights being identified individually as an identified entity, and others of said lights being identified in groups as group entities;

(b) Receiver means interconnected with each of said entities for individually conditioning said entities to any selected one of a plurality of states;

(c) Control means selectively conditionable to producee control signals individually representing said plurality of states;

(d) Communication means interconnecting said control means and said receiver means for communicating said signals from said control means to said receiver means; and (e) Conditioning means including said receiver means effective when said source of normal energizing power is interrupted for individually conditioning said identified entity and group entities to states individually represented by selected ones of said plurality of states.

24. A modular uninterruptible lighting system according to claim 23 wherein said plurality of states includes three different states.

25. A modular uninterruptible lighting system according to claim 24 wherein said conditioning means includes means for conditioning said identified entity and said group entities to different states.

26. A modular uninterruptible lighting system according to claim 23 wherein said plurality of states includes six different states.

27. A modular uninterruptible lighting system according to claim 26 wherein said conditioning means includes means for conditioning said identified entity and said group entities to different ones of said states.

28. A modular uninterruptible lighting system according to claim 23 wherein said conditioning means includes means for conditioning said identified entity and said group entities to different states.

29. A modular uninterruptible lighting system according to claim 23 further including normal switch means connecting said normal energizing electric power to said lighting system and in which one of said individual control signals individually representing said plurality of states is a first signal, said first signal being representative of a condition that when said normal switch means is in an on condition and said normal energizing electric power fails, for instructing one of said lights to remain on, and when said normal switch means is in an off condition and said normal energizing electric power fails for instructing said one of said lights to turn on.

30. An uninterruptible lighting system according to claim 29 further including override switch means for overriding said normal switch means, said override switch being effective when in an on condition to cause said first signal to represent a light on condition irrespective of the condition of said normal switch means.

31. An uninterruptible lighting system according to claim 23 further including normal switch means connecting said normal energizing electric power to said lighting system and in which one of said individual control signals individually representing said plurality of states is a second signal, said second signal being representative of a condition that when said switch means is in an on condition and said normal energizing electric power fails, for instructing one of said lights to remain on, and when said switch means is in an off condition and said normal energizing electric power fails for instructing said one of said lights to stay off.

32. An uninterruptible lighting system according to claim 31 further including override switch means for overriding said normal switch means, said override switch means being effective when in an on condition to cause said second signal to represent a light on condition irrespective of the condition of said normal switch means.

33. An uninterruptible lighting system according to claim 23 in which one of said individual control signals individually representing said plurality of states is a third signal, said third signal being representative of a condition that when said normal energizing electric power is on one of said lights is off, and when said normal energizing electric power fails, for instructing said one of said lights to turn on.

34. An uninterruptible lighting system according to claim 23 in which one of said individual control signals individually representing said plurality of states is a fourth signal, said fourth signal being representative of a condition that when said normal energizing electric power is on, one of said lights is on, and when said normal energizing electric power fails, for instructing said one of said lights to turn off.

* * * * *